United States Patent [19]

Yoshino et al.

[11] Patent Number: 4,827,112

[45] Date of Patent: May 2, 1989

[54] SYSTEM FOR PROCESSING IC CARD WITH DISPLAY FUNCTION

[75] Inventors: Akira Yoshino; Masafumi Hino, both of Hadano; Nobuhiro Yasue, Isehara, all of Japan

[73] Assignee: Hitachi, Ltd., Tokyo, Japan

[21] Appl. No.: 64,703

[22] Filed: Jun. 22, 1987

[30] Foreign Application Priority Data

Jun. 24, 1986 [JP] Japan ................................ 61-146240

[51] Int. Cl.⁴ .............................................. G06K 5/00
[52] U.S. Cl. ..................................... 235/380; 235/492
[58] Field of Search ................................ 235/380, 492

[56] References Cited

U.S. PATENT DOCUMENTS

4,529,870  7/1985  Chaum ................................ 235/380

Primary Examiner—Harold I. Pitts
Attorney, Agent, or Firm—Antonelli, Terry & Wands

[57] ABSTRACT

A card processing system having IC cards, and a device which executes information processing on the basis of information held in each IC card and information externally fed. A system for processing cards with a display function characterized in that each IC card is endowed with the display function, and that guidance information to be conveyed to a bearer of the IC card is generated and stored in the IC card at the time of the information processing, thereby to display the guidance information on the IC card.

7 Claims, 7 Drawing Sheets

| ALL MEDICINES RECEIPT | END STATUS | INTERNAL MEDICINE | END STATUS | INSPECTION | END STATUS | PHARMACY | END STATUS |
|---|---|---|---|---|---|---|---|

FIG. 9

| PATIENT NUMBER | RECEIPT DATE |
|---|---|
| NAME ||
| BIRTH DATE | SEX |
| RECEIPT MEDICINE NAME | CONTENTS | RECEIPT NUMBER |
| ↓ | ↓ | ↓ |
| GUIDANCE INFORMATION |||

900, 901, 902, 903, 904, 905, 906, 907, 910

SYSTEM FOR PROCESSING IC CARD WITH DISPLAY FUNCTION

BACKGROUND OF THE INVENTION

1. Field of the Invention:

The present invention relates to a card processing system which uses IC cards (integrated circuit cards). More particularly, it relates to a system for processing IC cards with a display function which is well suited to visually display guidance information effective for a card user on a display equipment such as of liquid crystal built in each IC card.

2. Description of the Prior Art:

An IC card can store a comparatively large number of information items therein, and has excellent features for keeping secrecy. Heretofore, various card processing systems utilizing these features of the IC cards and performing the identification of individuals, the management of the specified information of the individuals and the attendant information processes have been constructed.

Such card processing systems and apparatuses are described in NIKKEI ELECTRONICS dated Dec. 2, 1985, pp. 275-292, and the same bulletin dated Dec. 16, 1985, pp. 249-262.

Now, the card processing system in a prior art will be outlined as to a case of application to hospital management.

In a hospital, the IC card processing system is utilized for the systems of outpatient receipt management, anamnesis management, inspection data management, account management, etc. More specifically, a patient bears an IC card for his/her exclusive use and submits the IC card to a reception window. In the reception window, the IC card is inserted into an IC card reader/writer installed there, whereby the contents of the IC card are read to identify the patient. In a case where the patient is a new patient for the first medical examination, his/her condition, the desired contents of medical examination and treatment, etc. are written into the IC card in a predetermined format. On the other hand, in case of medical re-examination, the condition of a disease, the expected contents of medical examination and treatment, etc. at the current time are written into the IC card in a predetermined format by reference to the previous contents of medical examination and treatment stored in the IC card.

Subsequently, the patient bears the IC card and goes to the reception window of a designated department, to which he/she submits the IC card. In the departmental window, the IC card is subjected to a receipt process by the use of a card reader/writer installed in this window, whereupon information items on the examined and treated contents, the prescriptions of medicines, the necessity of any inspection, etc. are written into the IC card. If necessary, the patient goes to an inspection room, in which he/she is inspected and the results of the inspection are written into the IC card as in the foregoing. Likewise, the patient further goes to pertinent sections and is given necessary treatments in succession, and information items are written into the IC card or the contents of the IC card are updated in correspondence with the treatments. Lastly, the patient receives medicines prescribed on the basis of the information contained in the IC card, at a pharmacist's office. On that occasion, the fee is automatically paid from, for example, the deposit account of the patient through a bank system externally connected.

With the prior-art example, however, notwithstanding that the patient must go to a large number of sections in succession within the hospital, no means is comprised for effectively informing the patient of the guides of the goals, the instructions of precautions, etc., and such matters are often conveyed orally. This has led to such problems that many mistakes arise and that a wasteful time is expended for seeking the desired section.

SUMMARY OF THE INVENTION:

The present invention has been made in order to solve the aforementioned problems, and has for its object to provide a system for processing IC cards with a display function in which guidance information etc. to be reported to the user of each IC card are visually displayed on the IC card, thereby to effectively convey information to the user.

According to the present invention, the object is accomplished in such a way that a display element of liquid crystal or the like, and a power supply element (for example, lithium cell) for driving the display element are incorporated in the IC card, thereby to establish the function of displaying information written in a predetermined format, while the control unit of an IC card reader/writer is adapted to generate the guidance information etc. to be reported to the user, on the basis of information already stored in the IC card and other information obtained anew, thereby to establish the function of writing the display information into the IC card in the predetermined format.

The IC card in which the display element and the element for supplying power thereto are built has the function of displaying the information items internally stored, ordinarily some of the stored items, in the statuses which the user can directly see with the eye, such as letters, characters, numerals and patterns. The information displaying function can be demonstrated while continuing for a required period of time owing to the power supply element.

Accordingly, the IC card is inserted into the card reader/writer to execute predetermined information processing and simultaneously to write in predetermined forms the goal guides, precautions etc. which are to be displayed on the card. Thus, even after the IC card is taken out of the card reader/writer, the information can be conveyed for the required time in the state in which the user can directly see it with the eye.

DESCRIPTION OF THE PREFERRED EMBODIMENTS

Now, the present invention will be described in detail with reference to the drawings as to an embodiment applied to the outpatient receipt system of a hospital by way of example.

Figure 1:
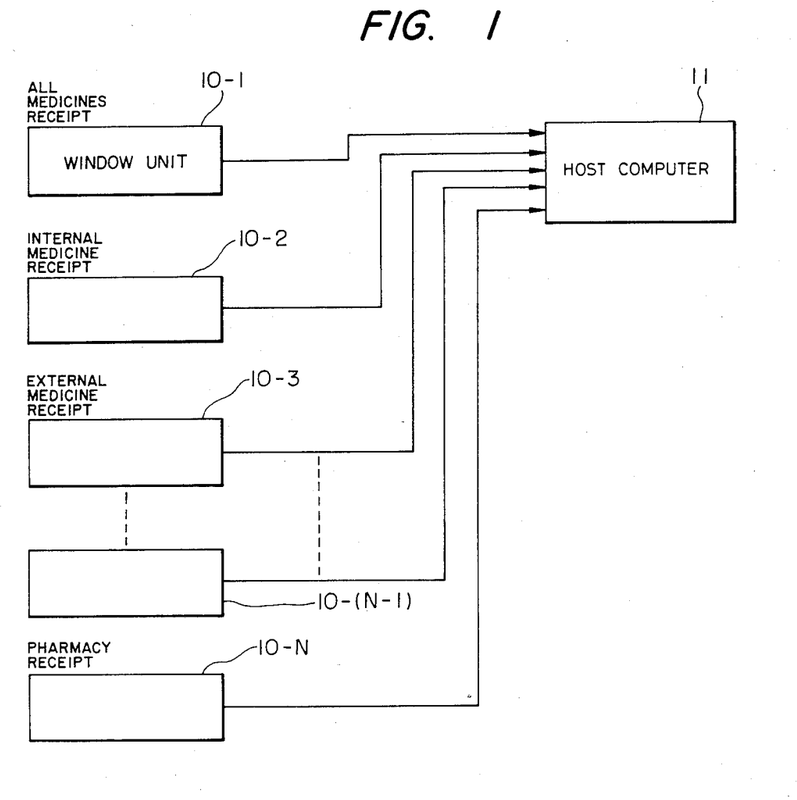
FIG. 1 is a block diagram showing an example of arrangement of the outpatient receipt system of a hospital to which the system of the present invention for processing IC cards with a display function is applied.
Figure 2:
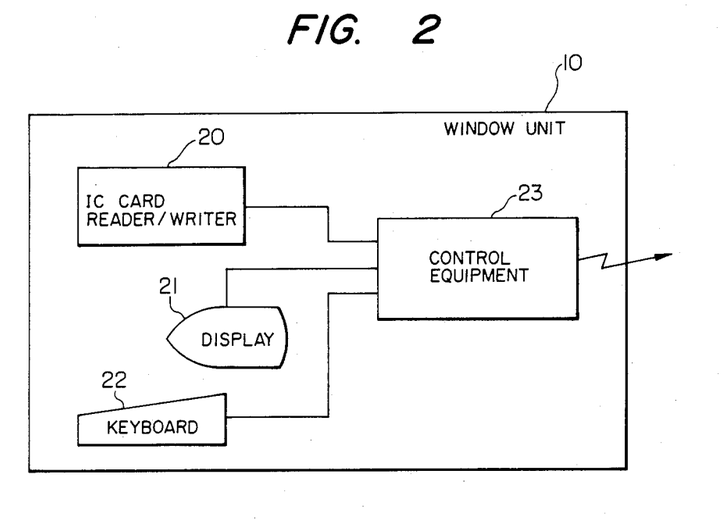
FIG. 2 is a block diagram showing an example of arrangement of a window unit.
Figure 3:
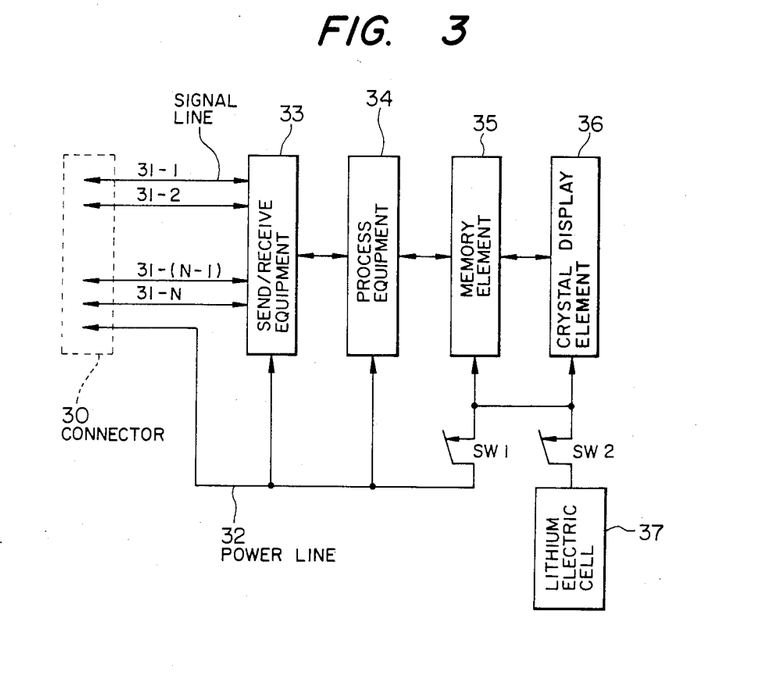
FIG. 3 is a block diagram showing an example of arrangement of the IC card with the display function.

In FIGS. 1-3, symbols 10, 10-1, . . . and 10-N denote window units, numeral 11 a host computer, numeral 20 an IC card reader/writer, numeral 21 a display, numeral 22 a keyboard, numeral 23 a control equipment, numeral 30 a connector, symbols 31-1, . . . and 31-N signal lines, numeral 32 a power line, numeral 33 a send-/receive equipment, numeral 34 a process equipment, numeral 35 a memory element, numeral 36 a liquid crystal display element, and numeral 37 a lithium electric cell.

As shown in FIG. 1, the hospital outpatient receipt system to which the system for processing the IC cards with the display function according to the present invention is applied is so constructed that the large number of window units 10-1 thru 10-N are connected to the host computer 11 which receives data from the window units so as to send data thereto and to execute desired data processes. The window units 10-1 thru 10-N are installed in pertinent places within the hospital, such as an overall window, an internal department window, a surgical department window, a pharmacy window and a consulting room. All the window units are similarly constructed, and the construction is shown as a window unit 10 in FIG. 2.

The window unit 10 is so constructed that the card reader/writer 20 which reads and writes information from and into the IC card with the display function, the display 21 which is used as a monitor when, for example, an operator inputs required data, and the keyboard 22 with which the operator inputs the required data, are connected to the control equipment 23. The control equipment 23 includes a memory circuit, and has the functions of an input/output control for the card reader/writer 20, a display control for the display 21, the control of data input from the keyboard 22, and a transmission control for the communication between the control equipment 23 and the host computer 11.

As shown in FIG. 3, the IC card with the display function is composed of the connector 30 which includes contact electrodes connected to the reader/writer 20, the send/receive equipment 33 which sends and receives information externally, the memory element 35 which stores the information sent from outside, the process equipment 34 which processes the stored information, the liquid crystal display element 36 which displays the stored information, and the lithium cell 37. The send/receive equipment 33, the process equipment 34, the memory element 35 and the liquid crystal display element 36 which constitute the IC card are operated by being supplied with electric power from the window unit 10 while the IC card is inserted in the reader/writer 20 of the window unit 10. In contrast, in a case where a patient carries the IC card alone, only the memory element 35 and the liquid crystal display element 36 necessary for the display operation are supplied with the electric power by the lithium cell 37. For this reason, electronic switches SW1 and SW2 incorporated in the power line 32 are constructed so as to be automatically controlled "on" or "off" depending upon whether or not the IC card is inserted in the reader/writer 20.

Such an IC card with the display function is issued to a new patient for the first medical examination. When it is issued, data items, for example, the name of the patient to be examined, the sex, the birth date, the age, the name of a department for the examination, chart (Karte) No., and the name of a bank with account No. from which fees such as a consultation fee are to be paid are stored in the memory element 35.

Now, an example of a patient to be examined in the department of internal medicine will be mentioned and described.

The new patient to be examined in the internal department goes to the overall reception office of the hospital. He/she fills up a consultation ticket and a questionnaire with necessary matters and submits them to the office, so as to have the IC card with the display function issued. Information items in a data format as shown in FIG. 9 are stored in the memory element 35 of the issued IC card with the display function.

Figure 9:
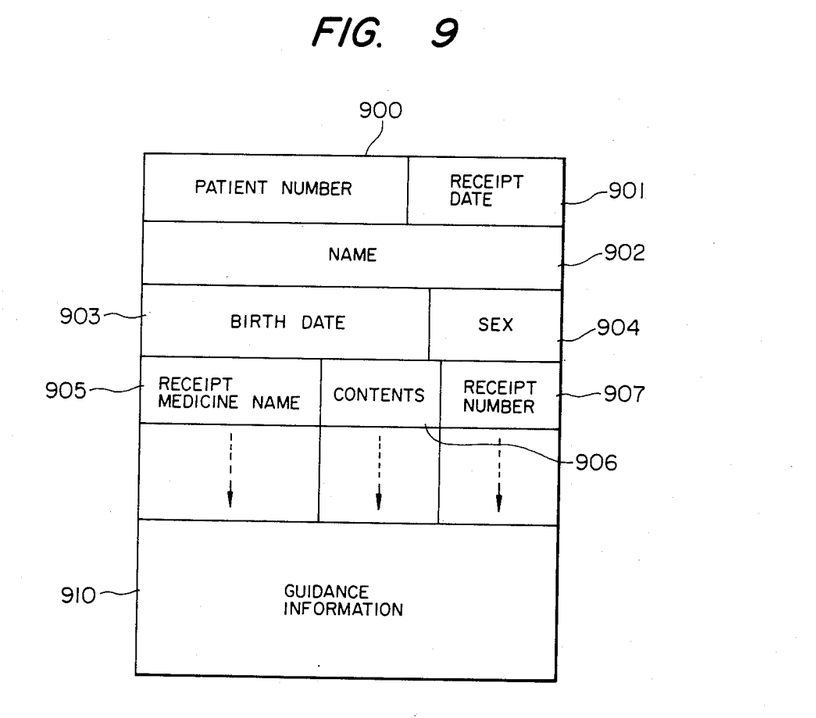
FIG. 9 is a diagram showing a data format in the IC card.

Referring to FIG. 9, the data format in the IC card is in the form of a clinical chart, which contains individual identification information items such as patient number 900, receipt date 901, name 902, birth date 903 and sex 904, information on medical examination and treatment such as department name 905, examination and treatment contents 906 and receipt number 907, and guidance information 910 for the patient.

In a case where the patient is to be re-examined, the contents of the previous examination and treatment have already been registered in the IC card managed by the patient (brought back by him or her), and hence, he/she may directly hand the IC card to the operator of the overall window without the necessity of the IC card issuing process at the time of the first medical examination.

Figure 8:
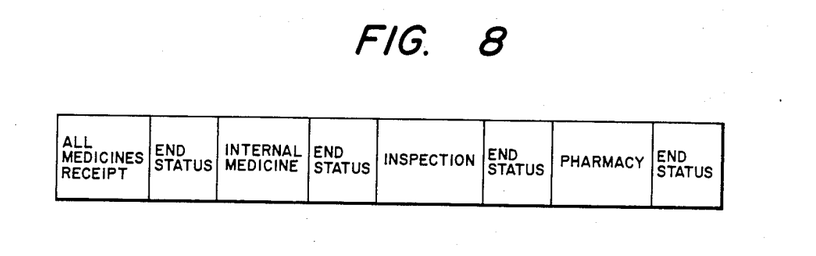
FIG. 8 is a diagram for explaining the format of information items which indicate goals and the order thereof and which are written into a memory element within the IC card by means of the window unit.

When the operator of the overall window has received the IC card with the display function, he/she inserts it into the card inserting slit of the IC card reader/writer 20 of the window unit 10-1. When the IC card has been put in the insertion slit, the contents of the memory element 35 built in this IC card with the display function are read and transferred to the control equipment 23 through the card reader of the IC card reader/writer 20. The control equipment 23 has control and memory circuits in which a program concerning the control contents of the input/output process control of the window unit 10-1 is set beforehand. It is also connected with the host computer 11, display 21 and keyboard 22, and it performs the input/output control of the window unit 10-1 to be described later. While the operator is monitoring results obtained with the input-/output control, by means of the monitoring display 21, he/she supplies information items on sections to which the patient for the examination is to go, as well as the order of the sections, to the IC card with the display function and stores them in the memory element 35 in a format as shown in FIG. 8 by way of example. Further, the operator stores in the memory element 35 the information of guidance for the examination, for example, window No. of the section where the patient is to go next. When the IC card with the display function has been handed to the patient after the end of the processes in the window unit 10-1, the guidance information is displayed on the liquid crystal display element 36 so as to inform the patient of the next goal. The examination information items obtained by the foregoing input/output processes in the window unit 10-1 are previously sent via the host computer 11 to the window unit of, e.g., a consulting room in which a doctor in charge is. In addition, information necessary for the centralized management of information items from the respective window units is sent to the host computer 11.

Figure 4:
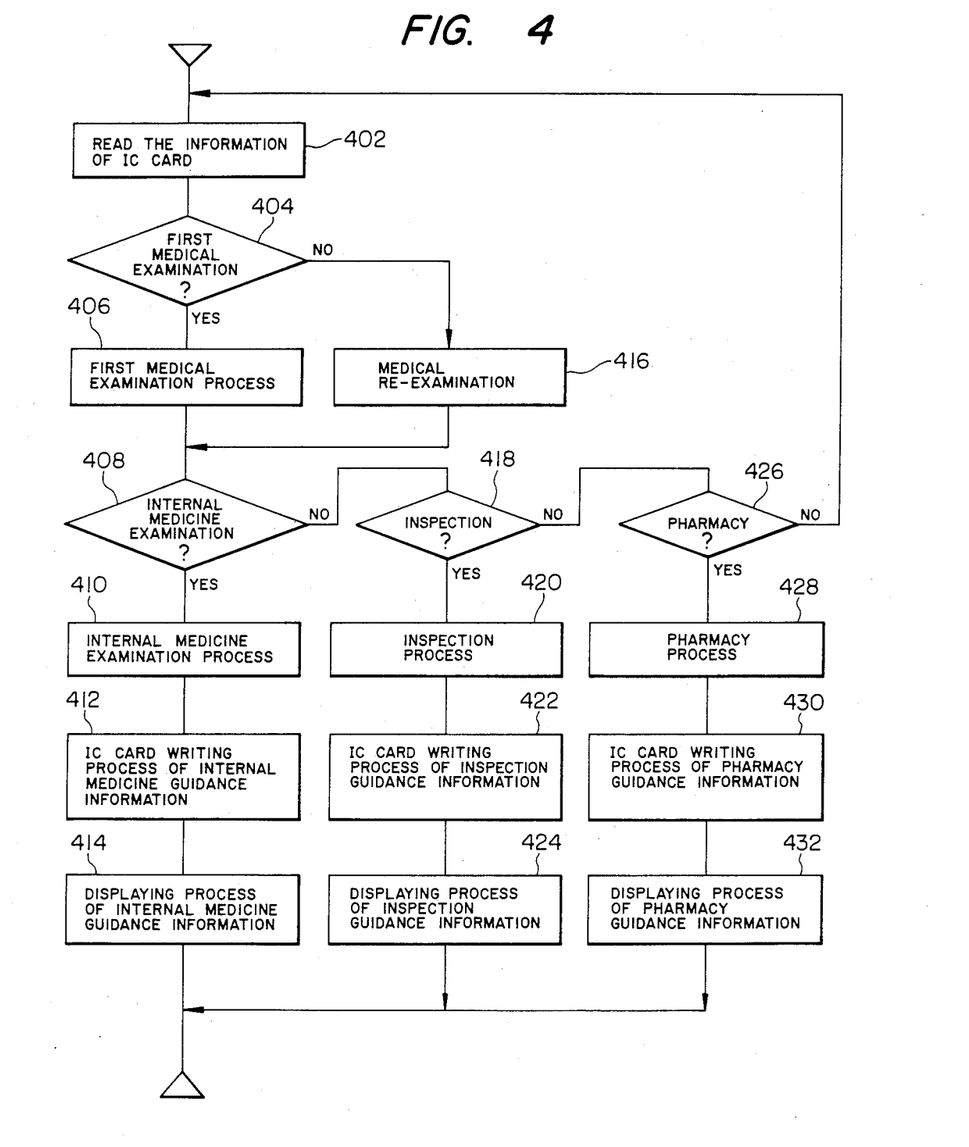
FIG. 4, FIG. 6 and FIG. 7 are diagrams showing the flow charts of the control programs of several window units.

FIG. 4 is a flow chart of the control program for controlling the window unit of the overall window of the hospital. The control operation will be described in more detail with reference to this figure.

When the IC card with the display function has been inserted into the card reader/writer 20 of the window unit 10-1 in the overall reception office, the control equipment 23 performs an IC card content reading process 402 for receiving read information from the card reader/writer 20. While asking questions of the patient for the examination of the internal department on the basis of the read information received, the operator of the overall window inputs the examination contents etc. into the IC card in the predetermined format through the keyboard 22, depending upon whether or not the patient is for the first medical examination (flow 404). Then, a process for the first examination (flow 406) or a process for the re-examination (flow 416) is performed. In a case where the medical examination of the internal department is required (flow 408), the control equipment 23 of the window unit 10-1 of the overall reception office executes an internal medical examination process (flow 410), in which internal medical examination information items obtained by the above processes are sent to the host computer 11 and are stored in the memory circuit of the control equipment 23 and recorded as predetermined contents under the control of a system control circuit. Further, the process (flow 412) of writing the internal medical examination information items into the IC card with the display function is executed via the card reader/writer 20 of the window unit 10-1. On this occasion, among the sections to go as stored in the memory element 35 of the IC card, the place of the overall window is simultaneously subjected to the process of writing to the effect that the receipt at the overall reception office has ended. The card reader/writer 20 of the window unit 10-1 of the overall reception office, which has obtained the internal medical examination information from the control equipment 23, performs the process (flow 414) of storing the internal examination guidance information of the patient to be examined in the internal department, in the memory element 35 of the IC card with the display function on the basis of the internal medical examination information and then displaying the guidance information on the liquid crystal display element 36.

In a case where an inspection is required (flow 418) or merely medication is required (flow 426) without the necessity of the internal medical examination, the control equipment 23 correspondingly performs an inspection process (flow 420) or a pharmacy process (flow 428), the process (flow 422 or 430) of writing process information and guidance information into the IC card, and the process (flow 424 or 432) of displaying the guidance information on the IC card as in the case of the internal medical examination.

Figure 5A:
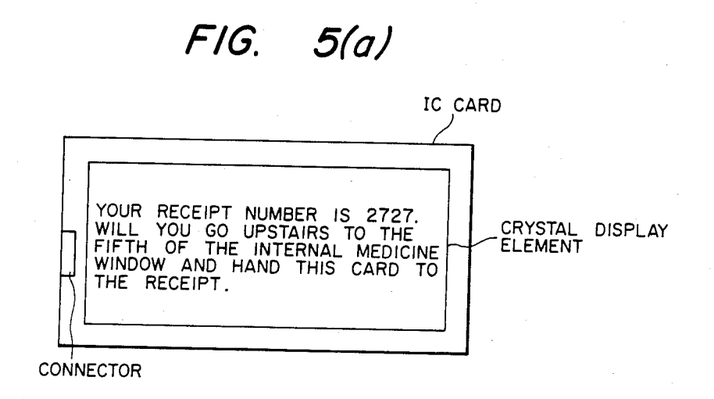
FIGS. 5(a)-5(c) are diagrams each showing an example of a guidance display on the IC card.

When the above processes have ended, the IC card with the display function is taken out of the window unit 10-1 of the overall reception office and is handed to the patient. Since the guidance information as shown in FIG. 5(a) by way of example is displayed on the liquid crystal display element 36 of the IC card, the patient to be examined in the internal department goes to the window of the internal department in accordance with this guidance.

Figure 6:
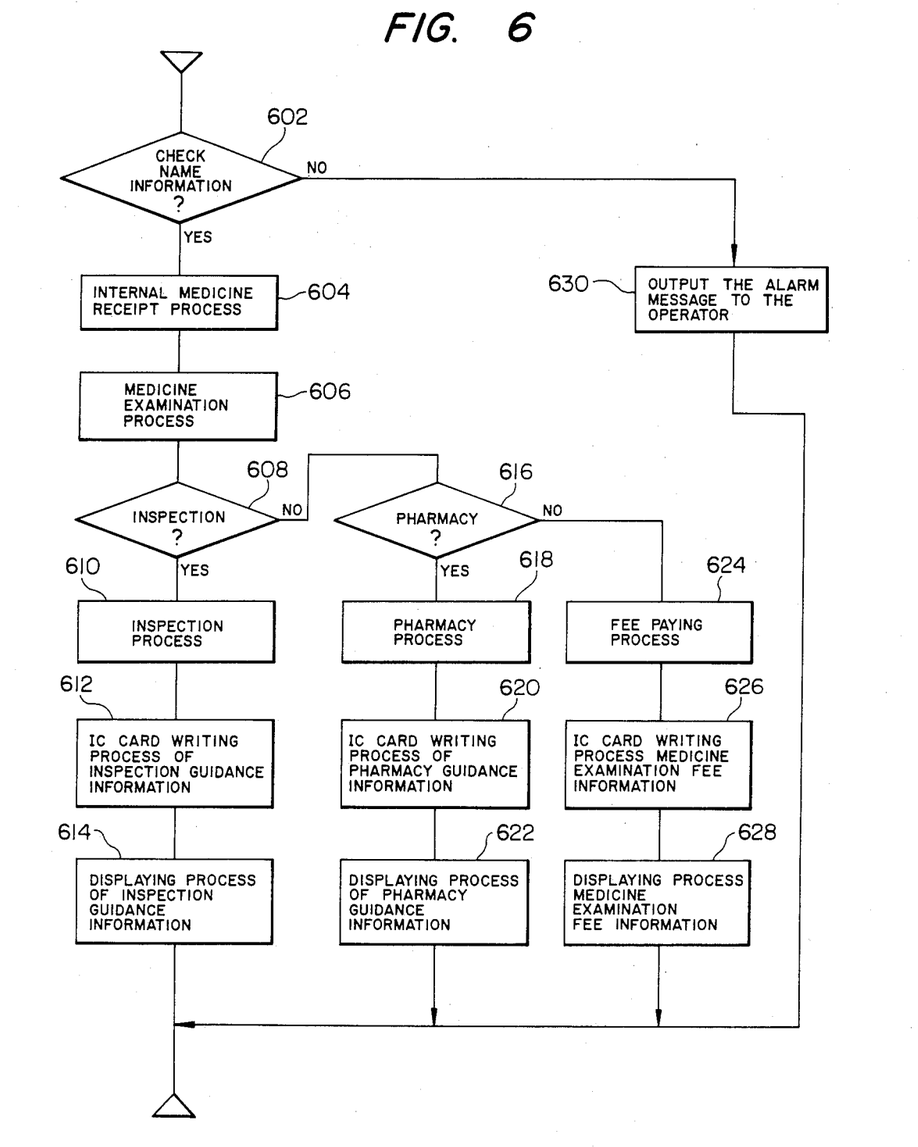

FIG. 6 is a flow chart of a control program for controlling the window unit installed in the internal department.

When the patient to be examined in the internal department submits the IC card to the window of this department, the receptionist operator of the internal department inserts the IC card into the card reader/writer 20 of the window unit 10-2 of this department. Thus, the control equipment 23 receives read information from the card reader/writer 20, and it checks the name information and also checks whether or not the section to which the patient is to go is proper and whether or not the receipt of the overall window has ended (flow 602), and it executes the process of receipt at the internal department (flow 604), thereby to complete the receipt operation of this department. During the medical examination of a doctor, information items on the condition of a disease, the prescription of medication, etc. decided by the doctor are written from the reader/writer 20 of the window unit available to the doctor, into the IC card of the patient under examination through the keyboard 21, and the control equipment 23 executes a medical examination process (flow 606) which includes sending these information items to the host computer 11.

Further, in a case where an inspection (flow 610) is required or where medication (flow 616) is required, the control equipment 23 performs corresponding processes (flows 610, 612 and 614 or flows 618, 620 and 622) just as already elucidated in FIG. 4. Meanwhile, in a case where neither the inspection nor the medication is required, the patient examined in the internal department corresponds to the end of medical examination and treatment. At this point of time, therefore, the calculation of points for the medical examination and treatment contents, etc. is executed by the control equipment 23 of the window unit in accordance with the process (flow 624) of paying a fee for the medical examination and treatment. Further, the presence or absence of a bank account is checked by the host computer 11, whereupon in the present of the account, the fee is automatically paid, and in the absence thereof, the patient is instructed to go to an account window and pay there. Also, the process (flow 626) of writing the consultation fee into the IC card and the process (flow 628) of displaying it are executed.

Figure 5B:
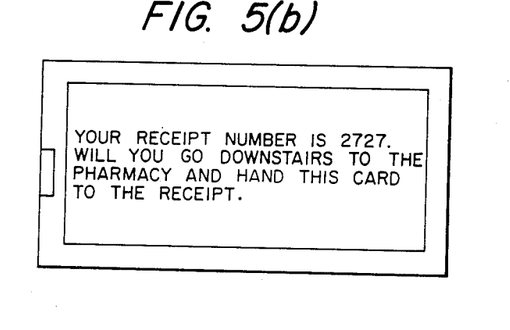

If, at the end of the foregoing process of the internal medical examination, the patient needs to be medicated, a guidance display as shown in FIG. 5(b) by way of example is presented on the liquid crystal display element 36 of the IC card with the display function handed to the patient. According to the guidance display, the patient moves to the pharmacy and hands the IC card to the receptionist operator of the pharmcy.

Figure 7:
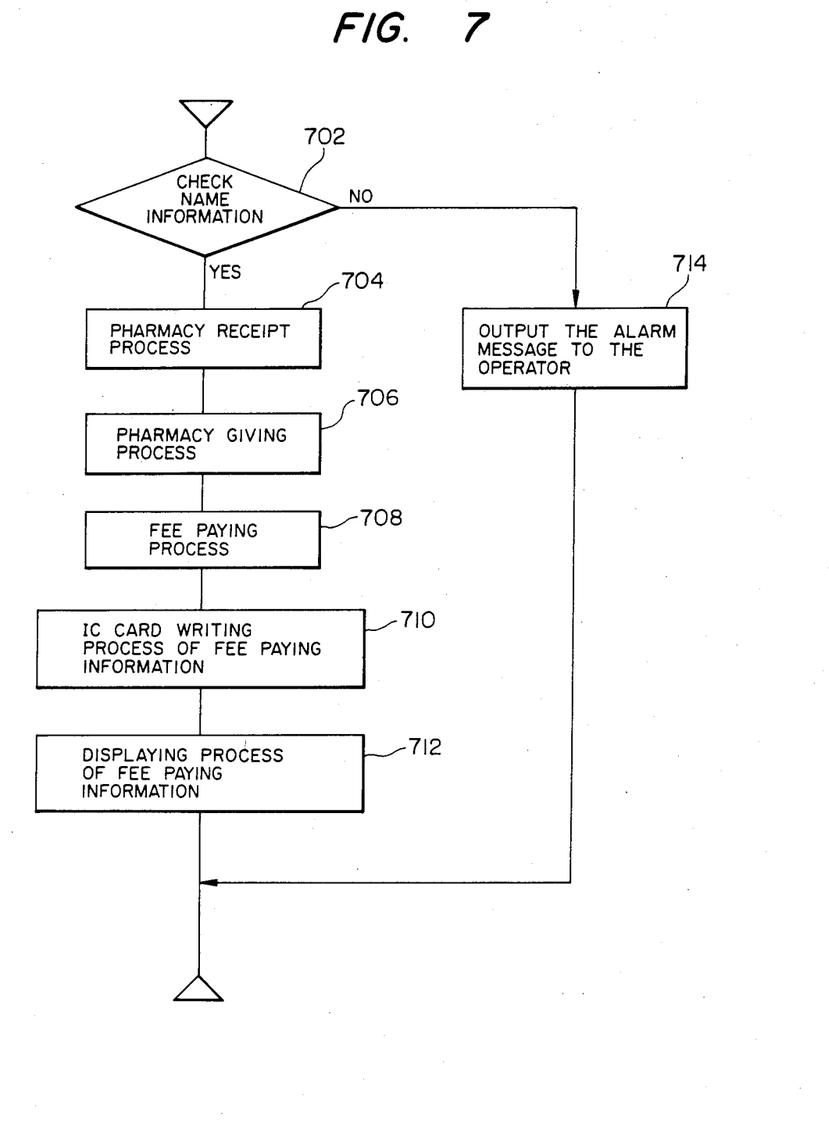

FIG. 7 is a flow chart of a control program for controlling the window unit installed in the pharmacy reception office.

The operator in the pharmcy reception office inserts the IC card into the card reader/writer 20 of the window unit 10-N of the pharmacy, to read out the medical examination information from the memory element 35 of the IC card and check the name information, the end information of the medical examination of the internal department, etc. (flow 702) and to execute a pharmacy receipt process (flow 704), thereby to complete the receipt operation of the pharmcy. Thereafter, a medicine is compounded by a pharmacist. If necessary, precautions in the case of taking the medicine, etc. are written into the memory element 35 of the patient's IC card with the display function through the keyboard 22 and are displayed on the liquid crystal display element 36 as a medication process (flow 706). When the medication process is over, the patient examined in the internal department ends the medical examination and treatment. At the subsequent stage, therefore, a fee paying process (flow 708), the process (flow 710) of writing a medical examination and treatment fee, etc. into the IC card, and the process (flow 712) of displaying them are carried out.

Figure 5C:
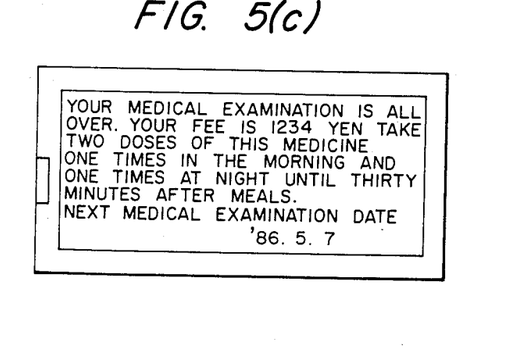

Lastly, the patient examined in the internal department receives the medicine and the IC card with the display function. The fee of the current treatment, notes for taking the medicine, the date of the next medical examination, etc. are displayed on the IC card as shown in FIG. 5(c) by way of example. In this manner, the guidance information for the medical examination is displayed on the IC card with the display function to the patient who is examined, under the state under which it can be directly seen with the eye, whereby the information can be effectively conveyed to the patient for the medical examination.

In the description of the embodiment, in a case where the decision of the flow 426 is NO in the flow chart of the control program in FIG. 4, re-processing for another department of the hospital is performed. In a case where the result of the name information check (flow 602 or 702) is NO in the flow chart of the control program in FIG. 6 or FIG. 7, the situation is, e. g., an occasion in which the patient to be examined or treated has submitted the IC card erroneously to the window, and the process (flow 630 or 714) of outputting an alarm message to the operator of the window is carried out.

The information items on the sections to which the patient to be examined and treated is to go, as well as the order thereof, and in the format shown in FIG. 8, these items being stored in the memory element 35 of the IC card with the display function at the time of the overall receipt, are also stored in the host computer 11 in correspondence with the particular patient. Each time the host computer 11 is fed from the window unit with the end status information of the section to which the patient goes, it checks this information so as to manage, e. g., if the patient is properly moving to the respective sections. That is, when the sections to which the patient is to go are input to the IC card in the window unit of the overall reception office, the information items are stored in the host computer 11 beforehand, while the host computer 11 compares the stored information with the end status information of the section to which the patient goes, this information being sent from the window unit of each department. This associated operation makes it possible to check the degrees of crowdedness of the respective sections and to give the window units the instructions of altering the orders of the goals, according to the degrees of crowdedness, etc. When the patient has submitted the IC card to the corresponding window, the instructed window unit writes the alteration of the order of the subsequent goals into the memory element 35 of the IC card.

In the above, the embodiment of the present invention has been explained as to the case where the present invention is applied to the outpatient receipt system of the hospital. As another embodiment, there is an application to a receipt system in a public institution, for example, a city government.

A visitor tells an operator the contents of use at an overall reception office. The operator inputs the contents of use, etc. through a keyboard, to perform the processes of sending visitor information etc. to a host computer and displaying use guidance information on an IC card, whereupon he/she hands the IC card to the visitor. While seeing the use guidance information displayed on the IC card, the visitor moves to the windows of sections to-be-used in succession, and receptionist operators at the windows of the sections for use processes the IC card of the visitor. Thus, the purpose of use of the visitor can be efficiently achieved.

Also, the present invention is applicable to a receipt system for issuing and renewing drivers' licenses.

In the foregoing embodiment of the present invention, a primary cell such as the lithium cell has been used as the driving power source of the liquid crystal display element or the like in the IC card with the display function. However, the display period of time may be short in some cases, depending upon the contents of service and the frequence of use of a system. In such cases, an accumulator or a capacitor can be used. To the contrary, in a case where a display for a still longer time is needed, a solar cell can be conjointly used. In addition, the liquid crystal display element of the IC card with the display function can be replaced with a display element which is based on another known principle.

As regards some service contents to which the present invention is applied, a user does not want to leave a display content behind. In this case, it is also possible to adopt a construction in which the IC card with the display function is additionally provided with a switch for erasing the display partly or wholly.

The embodiment of the present invention has been so constructed that the host computer is installed to perform the exchange of information among the window units and the centralized management of the information items of the respective window units. However, the present invention is also applicable to a system in which the functions of the control equipments of the respective window units are simplified to execute the information processes of the window units in centralized fashion by the host computer, or a system in which, conversely to the above, the control equipments of the respective window units execute all the processes to dispense with the host computer. Either system can be adopted according to service contents and service aspects.

Further, the embodiment of the present invention has been so constructed that the control equipment of each window unit reads and checks information in the IC card with the display function and that it writes necessary information into the IC card. However, it is also allowed that the process equipment within the IC card be endowed with such functions and that each window unit afford only code information for identifying a reception office, to the IC card.

As described above, according to the present invention, guidance information items such as the order of receipts and the windows of goals are visually displayed on an IC card with a display function for the owner or user of the IC card, whereby the guidance information items can be conveyed accurately and effectively.

We claim:

1. A card processing system comprising IC cards each of which includes a visual portion, and means to read/write information in said each IC card, guidance information for a user of said IC card being displayed on said IC card.

2. A card processing system comprising IC cards each of which includes a visual portion, and window units each of which includes means to read/write information in said each IC card, said system performing processes which include the first means of reading out information in said IC card, the second means of determining on the basis of the read information the window unit to which a user of said IC card is to go, and the third means of displaying guidance information for specifying said window unit to which the user is to go, on said display portion of said IC card.

3. A card processing system according to claim 2, wherein said second means determines the window unit to which the user of said IC card is to go, on the basis of information indicating the window unit already visited by the user and written in said IC card, and information according to a progress of processes for the user of said IC card.

4. A card processing system according to claim 3, wherein said system is an outpatient receipt processing system of a hospital, and said window units are installed in an overall reception office, an internal department reception office, a surgical department reception office, an inspection reception office, a pharmacy reception office, etc.

5. A card processing system comprising IC cards each of which includes a display portion, window units each of which includes means to read/write information in said each IC card, and a host computer which is connected to said window units, said system performing processes which include the first means of reading out user identification information in said IC card and sending it to said host computer by means of said window unit, the second means of receiving information for specifying the window unit to which a user of said IC card is to go, from said host computer on the basis of information indicating the window unit visited by the user, and the third means of displaying said information for specifying the next window unit.

6. A card processing system according to claim 5, wherein said system second means determines said window unit to which the user of said IC card is to go subsequently, on the basis of the information indicating the window unit already visited by the user and stored in said host computer, and information according to a progress of processes for the use of said IC card.

7. A card processing system according to claim 6, wherein said system is an outpatient receipt processing system of a hospital, and said window units are installed in an overall reception office, an internal department reception office, a surgical department reception office, an inspection reception office, a pharmacy reception office, etc.

* * * * *